Oct. 23, 1962   E. E. KELLER ET AL   3,059,474
TEMPERATURE INDICATING DEVICE
Filed Sept. 24, 1959
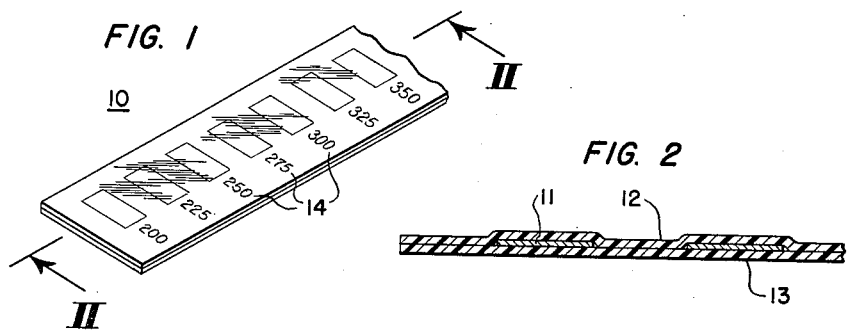
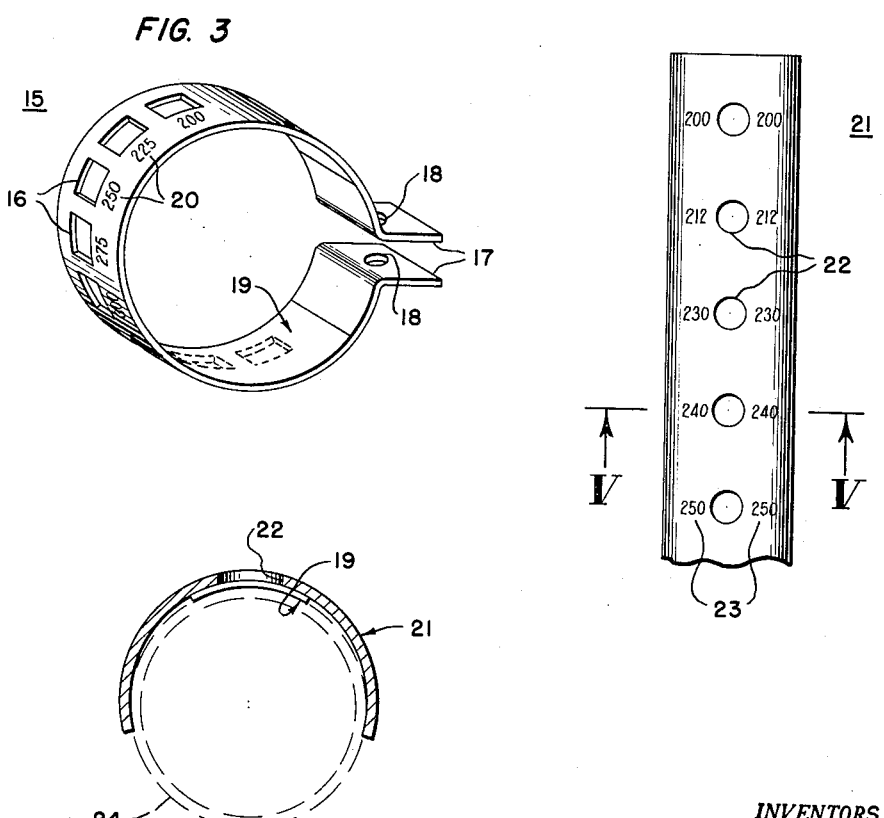
INVENTORS
EDWARD E. KELLER
RUSSELL R. MEDICO
BY
Walter J. Jason
ATTORNEY

United States Patent Office 3,059,474
Patented Oct. 23, 1962

3,059,474
TEMPERATURE INDICATING DEVICE
Edward E. Keller, La Mesa, and Russell R. Medico, San Diego, Calif., assignors to General Dynamics Corporation (Convair Division), San Diego, Calif., a corporation of Delaware
Filed Sept. 24, 1959, Ser. No. 842,070
4 Claims. (Cl. 73—358)

The present invention relates to temperature indicating devices and more particularly to a device for indicating the peak or maximum temperature to which a system or component has been subjected.

Hydraulic systems such as those employed to operate the landing gear, brakes, control surfaces, etc., in aircraft require extensive testing before the airplane can be certified for commercial use. Once the airplane has been centrified and scheduled into regular service, periodic inspection and servicing of the hydraulic systems is necessary to assure continued safe and proper operation.

When a failure or impending failure occurs in a system component, the temperature of the hydraulic fluid as well as the temperature of the faulty component rises beyond its normal operating range. Temperature variations can be readily detected through the use of thermocouples installed at strategic locations throughout the system. However, thermocouples have disadvantages since weight and space requirements often make such installations undesirable. In addition thermocouples are expensive in themselves and usually involve considerable expense to install. These disadvantages are further magnified by the multiplicity of thermocouples as required to accurately record temperatures at various points throughout each of the several complex systems in an aircraft.

Accordingly an object of the present invention is to provide a novel form of temperature indicating device having a minimum of weight and volume and particularly adapted for use in areas inaccessible to conventional temperature indicators.

Another object is the provision of a temperature indicating device whose low cost, simplicity and ease of installation and removal particularly adapts it for use where only one temperature reading or occasional temperature readings are desired.

Another object is the provision of an improved form of temperature indicating device which will visually indicate the maximum temperature attained of any object in contact therewith.

Other objects and features of the present invention will be readily apparent to those skilled in the art from the following specification and appended drawings wherein is illustrated a preferred form of the invention, and in which:

FIGURE 1 is a perspective view of the temperature indicating device of the present invention.

FIGURE 2 is an enlarged longitudinal sectional view taken on the line II—II of FIGURE 1.

FIGURE 3 is a perspective view of a windowed clamp having the temperature indicating means embodied therein.

FIGURE 4 is a plan view of a portion of a conduit fitting having the temperature indicating means internally bonded thereto, and FIGURE 5 is an enlarged sectional view taken on the line V—V of FIGURE 4.

Referring now to the drawings, there is illustrated at FIGURE 1, a temperature indicating device generally designated in its entirety by the numeral 10. Indicating device 10 embodies a sandwich construction which comprises a multiplicity of individual temperature sensitive strips or blocks 11 interposed between an elongated upper sheet or layer 12 and a lower sheet or layer 13.

The temperature sensitive strips or blocks 11 are formed of a suitable backing such as black blotting paper. Suitably placed on the surface of the individual backings are chemicals of progressively different melting points and which may be white in color. Each of the blocks will be sensitive to a particular temperature and when that temperature is attained the chemical thereon will melt and become absorbed by the black blotting paper of the backing and the color of the block will be black to thus provide an indication that a particular temperature has been reached. Chemicals which react at specific temperatures are readily commercially available and are well known to the skilled in the art. The particular chemicals employed are dependent on the range of temperatures expected to be encountered and on the difference required between consecutive indicated temperatures. From the above it is understood that the present invention is not limited to any specific or particular temperature sensitive chemicals but contemplates the use of suitable commercially available materials.

Upper and lower sheets 12 and 13 are of a suitable clear or transparent synthetic resin plastic material. In practice such plastics as tetrafluoroethylene resin, commercially available as "Teflon," or polyethylene resin, sold under the trade name "Alathon" may be employed. Again the plastic material employed in the present invention is not limited to any specific or particular plastic material. Various suitable plastics useable in the present invention are readily obtainable in the commercial market. Plastic is desirable since it is mechanically strong, and resists the effects of humidity, oils and the like.

Upper sheet 12 is preferably heat sealed or heat bonded to lower sheet 13 around the periphery of each of the individual temperature sensitive blocks 11. If desired, a suitable heat resistant adhesive may be employed to secure sheets 12 and 13 together in lieu of being heat bonded. Upper sheet 12 is suitably marked as at 14 adjacent each of the strips 11 with the critical temperautre at which strip 11 will have changed color from white to black.

Temperature indicator device 10 is adapted to be mounted on a surface of a system component such as a pump or motor or on a panel such as an airfoil where it is desired to ascertain the maximum temperature the part has been subjected to. Any suitable adhesive may be employed for this purpose. Obviously sheet 13 is faced against the part so as not to obscure temperature figures 14.

In FIGURE 3 there is illustrated a generally circular clamp type temperature indicating device generally designated by the numeral 15. Clamp 15 is preferably made of metal but may be made of a suitable plastic if so desired and is provided with a plurality of spaced window openings 16. A pair of jaws 17 extending from clamp 15 are punched or bored at 18 to accommodate a bolt.

A temperature indicating envelope 19 similar in construction to temperature indicating device 10 except for the omission of the temperature markings 14 is suitably secured to the inner surface of clamp 15 in such a manner as to register the individual strips 11 with each of the window openings 16. Envelope 19 may be secured to clamp 15 with any suitable heat resistant adhesive. Temperature markings 20 are stamped or printed on the outer surface of clamp 15 adjacent each of the window openings 16 to correspond with the critical temperature of the individual strips 11. If desired, markings 20 may be in the form of a decalcomania and secured to clamp 15.

Clamp 15 is adapted for mounting on tubing or conduit wherein it is desired to determine the maximum temperature of the fluid circulating therein. In mounting clamp 15 on a tube or the like (not shown), jaws 17 are forcibly spread apart a sufficient distance to permit lateral installation there about. It will be apparent that temperature indicating envelope 19 when mounted will be in intimate and direct contact with the tubing. Clamp 15 is secured against displacement and longitudinal movement by a bolt and nut assembly (not shown) whereby jaws 17 are clamped together to effect engagement of the entire length of envelope 19 against the tubing.

FIGURE 4 and 5 illustrate a modified form of an elongate conduit fitting or clamp which is generally designated by the numeral 21. Fitting 21 may be fabricated from tubular metal or plastic material and as shown in FIGURE 5, is longitudinally cut to provide a device which is substantially semi-circular in cross-sectional configuration describing an arc having an included angle slightly in excess of 180 degrees. Window openings 22 spaced longitudinally along the center line of fitting 21 provide means for observing the temperature indicating envelope 19 which is secured to the inner surface of fitting 21 by a suitable adhesive. Temperature markings 23 corresponding with the critical temperature of the individual temperature sensitive strips 11 are disposed adjacent one or both sides of window openings 22 on fitting 21.

Fitting 21 is readily attached to a tubing or conduit 24, shown in dash lines in FIGURE 5, by snapping over the external diameter thereof. Thus temperature indicating envelope 19 is thereby placed in direct contact with tubing 24 to accurately record the maximum temperature of the fluid circulating therethrough. Fitting 21 is restrained against shifting or movement by its natural inherent resiliency. Where space permits, fitting 21 is preferred to clamp 15 due to the ease of installation and removal. Since the diameter of tubing 24 is different for various systems, it will be obvious that fitting 21 must be fabricated in several diametrical sizes to fit each particular tubing size.

While certain preferred embodiments of the invention have been specifically disclosed, it is understood that the invention is not limited thereto as many variations will be readily apparent to those skilled in the art and the invention is to be given its broadest possible interpretation within the terms of the following claims:

What we claim is:

1. A temperature indicator for measuring the maximum temperature of a heat source comprising a first layer of transparent plastic material, a second layer of plastic material adhered to said first layer, and a plurality of individual temperature sensitive strips contained between said first and second plastic layers and separated one from the other, said strips each having an area viewable through said first plastic layer, said viewable areas of said temperature sensitive strips embodying a backing having a chemical thereon of a known melting point, said chemicals on said strips having different melting points, said strips being arranged longitudinally of said plastic layers and in progression according to the melting point temperatures of said chemicals, each of said strips on melting of its chemical changing in color to indicate that a particular temperature has been attained.

2. A temperature indicating device comprising a clamp portion adapted to be fitted upon a conduit, said clamp portion having a temperature indicating device comprising a generally circular clamp portion having outwardly extending fan members adapted to be fastened together, said clamp portion having a plurality of openings spaced along the circumference thereof, and an elongate temperature reacting envelope member adhered to the interior surface of said clamp portion at the area of the openings therethrough, said temperature reacting envelope member measuring the maximum temperature of a heat source and comprising a first layer of transparent plastic material, a second layer of plastic material, and a plurality of individual temperature sensitive strips of material interposed and contained between said first and second plastic layers and isolated one from the other, said strips of material being disposed adjacent said openings of said clamp portion and having an area viewable through said openings and said first plastic layer, said viewable area of said temperature sensitive strips embodying a backing having a chemical thereon of a known melting point, said chemicals on said strips having different melting points, said strips being arranged longitudinally of said plastic layers and in progression according to the melting point temperatures of said chemicals, each of said strips on melting of its chemical changing in color to indicate that a particular temperature has been attained.

3. A temperature indicating device comprising a clamp portion adapted to be fitted upon a conduit, said clamp portion having a temperature indicating device comprising an elongated clamp portion which is generally semi-circular in cross-section said clamp portion having a plurality of openings therein arranged in spaced relationship along the length thereof, and an elongate temperature reacting envelope member adhered to the interior surface of said clamp portion at the area of the openings therethrough, said temperature reacting envelope member measuring the maximum temperature of a heat source and comprising a first layer of transparent plastic material, a second layer of plastic material, and a plurality of individual temperature sensitive strips of material interposed and contained between said first and second plastic layers and isolated one from the other, said strips of material being disposed adjacent said openings of said clamp portion and having an area viewable through said openings and said first plastic layer, said viewable area of said temperature sensitive strips embodying a backing having a chemical thereon of a known melting point, said chemicals on said strips having different melting points, said strips being arranged longitudinally of said plastic layers and in progression according to the melting point temperatures of said chemicals, each of said strips on melting of its chemical changing in color to indicate that a particular temperature has been attained.

4. A temperature indicating device adapted to measure the temperature of a conduit comprising an elongated sheet of resilient material formed into a substantially semi-circular shape and adapted to clamp to a cylindrical body, said sheet having a plurality of openings therein longitudinally arranged in spaced relationship, an elongated temperature reacting envelope member adhered to the interior surface of said elongated sheet adjacent said openings whereby said envelope member may be viewed through said openings, said temperature reacting envelope member comprising a first layer of transparent plastic material adjacent said openings, a second layer of plastic material, a plurality of individual temperature sensitive strips of material interposed and contained in individual compartments between said first and second layers, each adjacent to one of said openings and viewable therethrough each of said temperature sensitive strips comprising a black backing of absorbent material having a chemical thereon of a known melting point and having a color other than black, said color of said strips being viewable through said openings, said chemicals on said strips having different melting points, said strips being arranged longitudinally of said plastic layers and in progression according to the melting point temperatures of said chemicals, indicia adjacent said openings representing the melting point temperatures of said chemicals, whereby melting of said chemicals changes the color of said black backing to indicate that the temperature indicated by said adjacent indicia has been reached.

References Cited in the file of this patent

UNITED STATES PATENTS

| | | |
|---|---|---|
| 1,668,090 | Spencer | May 1, 1928 |
| 1,676,012 | Ferkel | July 10, 1928 |
| 1,692,012 | Wells | Nov. 20, 1928 |
| 2,308,087 | Lappala | Jan. 12, 1943 |
| 2,614,430 | Ballard et al. | Oct. 21, 1952 |
| 2,799,167 | Loconti | July 16, 1957 |
| 2,805,575 | Fredericks | Sept. 10, 1957 |
| 2,932,971 | Moore et al. | Apr. 19, 1960 |